(12) United States Patent
Krstulich

(10) Patent No.: US 7,881,199 B2
(45) Date of Patent: Feb. 1, 2011

(54) SYSTEM AND METHOD FOR PRIORITIZATION OF TRAFFIC THROUGH INTERNET ACCESS NETWORK

(75) Inventor: Zlatko Krstulich, Ottawa (CA)

(73) Assignee: Alcatel Lucent, Paris (FR)

( * ) Notice: Subject to any disclaimer, the term of this patent is extended or adjusted under 35 U.S.C. 154(b) by 793 days.

(21) Appl. No.: 11/324,314

(22) Filed: Jan. 4, 2006

(65) Prior Publication Data

US 2007/0153798 A1  Jul. 5, 2007

(51) Int. Cl.
*G01R 31/08* (2006.01)
*H04L 12/28* (2006.01)

(52) U.S. Cl. .............. 370/235; 370/252; 370/392

(58) Field of Classification Search .......... 370/392, 370/235, 252
See application file for complete search history.

(56) References Cited

U.S. PATENT DOCUMENTS

| | | | | |
|---|---|---|---|---|
| 6,445,163 | B1* | 9/2002 | Chenier et al. | 320/133 |
| 6,789,203 | B1* | 9/2004 | Belissent | 726/22 |
| 2003/0022336 | A1 | 1/2003 | Masuda et al. | |
| 2003/0048779 | A1* | 3/2003 | Doherty et al. | 370/389 |
| 2003/0145232 | A1* | 7/2003 | Poletto et al. | 713/201 |
| 2004/0001054 | A1 | 1/2004 | Nitta et al. | |
| 2004/0028054 | A1* | 2/2004 | Khurana et al. | 370/395.21 |
| 2004/0052212 | A1* | 3/2004 | Baillargeon | 370/235 |
| 2004/0158639 | A1* | 8/2004 | Takusagawa et al. | 709/229 |
| 2004/0165528 | A1* | 8/2004 | Li et al. | 370/230 |
| 2005/0088977 | A1* | 4/2005 | Roch et al. | 370/254 |
| 2006/0067297 | A1* | 3/2006 | Chaar et al. | 370/352 |
| 2006/0092958 | A1* | 5/2006 | Tancevski | 370/404 |
| 2006/0153160 | A1* | 7/2006 | Kalland et al. | 370/351 |
| 2006/0187838 | A1* | 8/2006 | Alex et al. | 370/235 |
| 2007/0061433 | A1* | 3/2007 | Reynolds et al. | 709/223 |
| 2007/0064697 | A1* | 3/2007 | Nesbitt et al. | 370/392 |

* cited by examiner

*Primary Examiner*—Daniel J Ryman
*Assistant Examiner*—John Blanton
(74) *Attorney, Agent, or Firm*—Kramer & Amado PC

(57) ABSTRACT

A method is provided for ensuring that specific traffic flows are adequately prioritized in a public packet communication network even when the network is heavily congested. Per-flow QoS capability is added to VPN tunnels. Connection requests are routed through a specific port in an access provider's network to designated VPN gateway. Deep packet inspection is performed on traffic through the port in an attempt to determine whether the connection request was accepted. If the connection request was accepted, the traffic flows associated with that session may be given a specific priority of QoS level when transiting a packet access network.

19 Claims, 2 Drawing Sheets

SYSTEM AND METHOD FOR PRIORITIZATION OF TRAFFIC THROUGH INTERNET ACCESS NETWORK

FIELD OF THE INVENTION

The invention relates to traffic management in packet communication networks, and more particularly to prioritization of individual traffic flows in such networks.

BACKGROUND OF THE INVENTION

The addition of priority mechanisms in public communication systems has traditionally been employed to allow emergency traffic to be carried at high priority. Certain portions of the Public Switched Telephone Network have been upgraded to add High Priority Calling, in which special priority on the access, switch, and trunk side of public networks is given to pre-designated individuals so that emergency responder can complete their connections. Giving such connections high priority is particularly important during times of crisis, when the PSTN tends to become over-congested and when emergency responders need reliable communication.

As communications move away from the PSTN and towards public packet communication networks, such as the Internet, access networks serving these packet communication networks should also be given the ability to assign prioritization to certain communication sessions. However, care should be taken that such an ability does not give high priority to malicious communication sessions or connection attempts, as such prioritization may exacerbate the effects of denial-of-service attacks. Such prioritization would provide value for emergency responders in times of crisis, and would also provide commercial benefits that carriers could derive by providing priority access to pre-determined gateways as a value added service for customers willing to pay a premium.

SUMMARY OF THE INVENTION

In accordance with one aspect of the invention, a method is provided for prioritizing traffic in a packet communication system destined for a receiving sub-network hosting a VPN gateway. Packets from an end user device and destined for the receiving sub-network are forwarded through a gateway in an access network. At the gateway, it is determined whether packets from the end user device are requesting a new session with the VPN gateway. At the gateway, it is non-invasively inferred from packets requesting a new session whether the request was accepted by the VPN gateway, independently of any shared secrets between the VPN gateway and the end user device. This inference may be made using deep packet inspection. If it is inferred that the request was accepted by the VPN gateway, then traffic flows for a session between the end user device and the VPN gateway are maintained at a priority level higher than a default priority level.

In one embodiment, if it is inferred that the request was rejected by the VPN gateway, then it is determined whether the rejection of the request has characteristics of a denial-of-service attack. If so, then further traffic flows from the end user device are rate limited.

In accordance with another aspect of the invention, a system is provided for prioritizing traffic in a public packet communication system destined for a receiving sub-network hosting a VPN gateway. An access network includes a subscriber and policy management system (SPMS) for informing other network elements within the access network to maintain traffic flows for a session at a priority level higher than a default priority level, a gateway providing communication to the VPN gateway, and an edge router for forwarding traffic destined for the VPN gateway to the gateway. The gateway includes means for determining whether packets from an end user device are requesting a new session with the VPN gateway. The gateway includes means for non-invasively inferring, independently of any shared secrets between the VPN gateway and the end user device, from packets requesting a new session whether the request was accepted by the VPN gateway. The gateway includes means for informing the SPMS that a session is to be given a priority level higher than a default priority level in the event that it is inferred that packets requesting the new session were accepted by the VPN gateway.

Apparatus are provided for carrying out the methods of the invention. The methods of the invention may be stored as processing instructions on computer-readable media.

The methods and apparatus of the present invention allow reliable prioritized communication over the access domains of a public packet communications network such as the Internet. For example, communications to an emergency response call center are given a high priority, enabling emergency response traffic to cut through access network congestion. High priority is given to the session only if the system decides that a VPN establishment request was successfully accepted by the receiving sub-network gateway, thereby preventing allocation of additional access system resources to denial-of-service attacks. The invention allows prioritization to be offered over multiple carrier domains and over different types of access networks. A carrier operating an access network can provide prioritization of a session without requiring details or advanced knowledge of user identity, or without becoming involved in the security associations or authentication process typically shared between end users and VPN gateways.

BRIEF DESCRIPTION OF THE DRAWINGS

The features and advantages of the invention will become more apparent from the following detailed description of the preferred embodiment(s) with reference to the attached figures, wherein.

It will be noted that in the attached figures, like features bear similar labels.

DETAILED DESCRIPTION OF THE EMBODIMENTS

Figure 1:
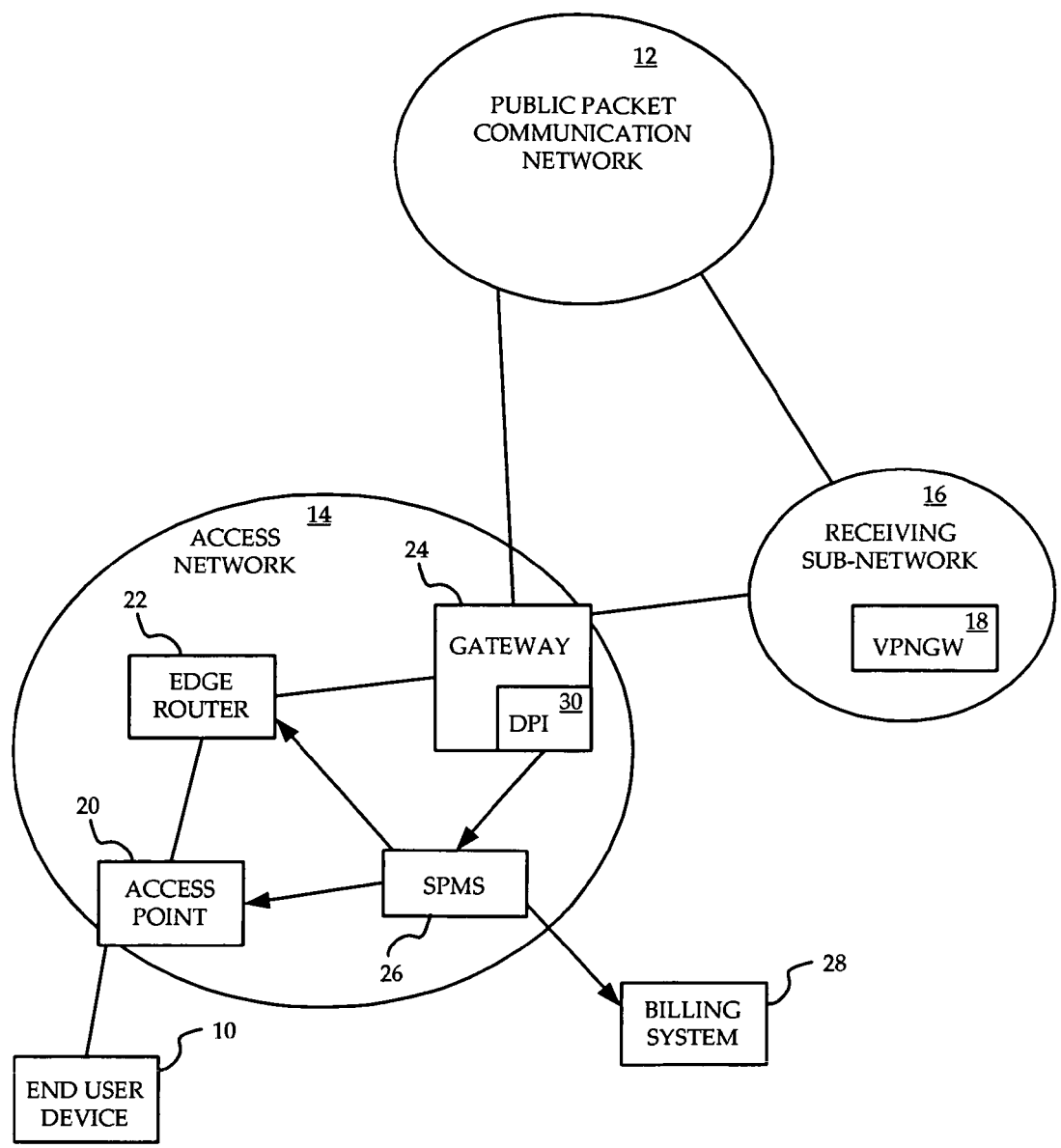
FIG. 1 is a diagram of a packet communication network according to one embodiment of the invention.

Referring to FIG. 1, a diagram of a packet communication network according to one embodiment of the invention is shown. A user of an end user device 10 accesses a public packet communication network 12, such as the Internet, through an access network 14. The public packet communication network 12 and the access network 14 are each in communication with a receiving sub-network 16, which includes a Virtual Private Network (VPN) gateway (VP-NGW) 18 having an address. The end user device 10 accesses the access network 14 through an access point 20 and an edge router 22. The end user device 10 and the access network 14 may each be of any type that allows a VPN connection to be established. As examples, the end user device 10 may be a personal computer, a PDA, or a data-mode cell phone. As examples, the access point 20 may be a DSLAM, a CMTS, a WiFi wireless access point, wireless mobility network, fixed wireless access station, or a fibre optic access point. The access network 14 includes a gateway 24 in communication with the receiving network 16, preferably over a dedicated connection but possibly over the public packet communication network 12 (i.e. the Internet) or another public packet communication network. The access network 14 includes a subscriber and policy management system (SPMS) 26 in communication with other network elements within the access network and responsible for establishing connection policies and per-hop behaviours for each specific end user packet flow transiting the access network 14. The SPMS 26 may also include a database which associates the end user identity or geographic address of the end user port connected to the access point 20 with a specific data flow or virtual path. The SPMS 26 is in communication with a billing system 28. The access point 20, edge router 22, gateway 24, and SPMS 26 are within the same administrative domain as that of the access network 14. The billing system 28 is preferably within the same administrative domain as that of the access network 14, although more generally the billing system may be owned by any entity providing billing services to the owner of the access network 14. The gateway 24 is shown in FIG. 1 as being a separate network element from the edge router 22, but may be a port within the edge router 22.

The packet communication network of FIG. 1 includes, for the purposes of simplicity of explanation, a single VPNGW and a single end user device. More generally, there may be any number of end user devices accessing the VPNGW, possibly through different access networks. There may also be more than one VPNGW, each with its own address within an address range owned by the receiving sub-network. Each VPNGW may have a set of more than one address.

The gateway 24 includes a deep packet inspector 30. If the gateway 24 is a port within the edge router 22 then the deep packet inspector 30 at the gateway 24 in the sense that the deep packet inspector 30 is within the edge router 22 but acts on traffic through the gateway 24. The deep packet inspector 30 performs Deep Packet Inspection on packets traveling to and from the receiving sub-network 16. The deep packet inspector 30 is in communication with the SPMS 26, as explained in more detail below. The deep packet inspector 30 is preferably in the form of software. More generally, the deep packet inspector 30 contains logical instructions in the form of any combination of software or hardware. Logical instructions in the form of software may be stored on a computer-readable medium.

In operation, the user attempts to establish a VPN tunnel from the end user device 10 to the VPNGW 18 by sending a VPN establishment request to the access network 14. The VPN establishment request may include a user name and a secure token, typically a shared secret. This is particularly useful since the VPN session may run over unsecured elements of the public packet communication network. Since the destination address of the connection request packets falls within the address or range or addresses reserved for the receiving sub-network, the edge router 22 routes the VPN establishment request to the receiving sub-network 16 through the gateway 24. The VPNGW 18 receives the VPN establishment request packets from the end user device 10, and either accepts the VPN establishment request or refuses the VPN establishment request. Such acceptance or refusal is carried out by an authentication process executed between the VPNGW 18 and related client software embedded within the end user device 10, the authentication process being inherent to the nature of the VPN being established. The authentication process does not involve the access network 14 or the public packet communication network 12 other than as a means to transport authentication packets between the end user device 10 and the VPNGW 18. As such, the access network 14, the public packet communication network 12, the gateway 24, the deep packet inspector 30, and the SPMS 26 need not be aware of or participate in the security associations between the user and the VPNGW 18.

Figure 2:
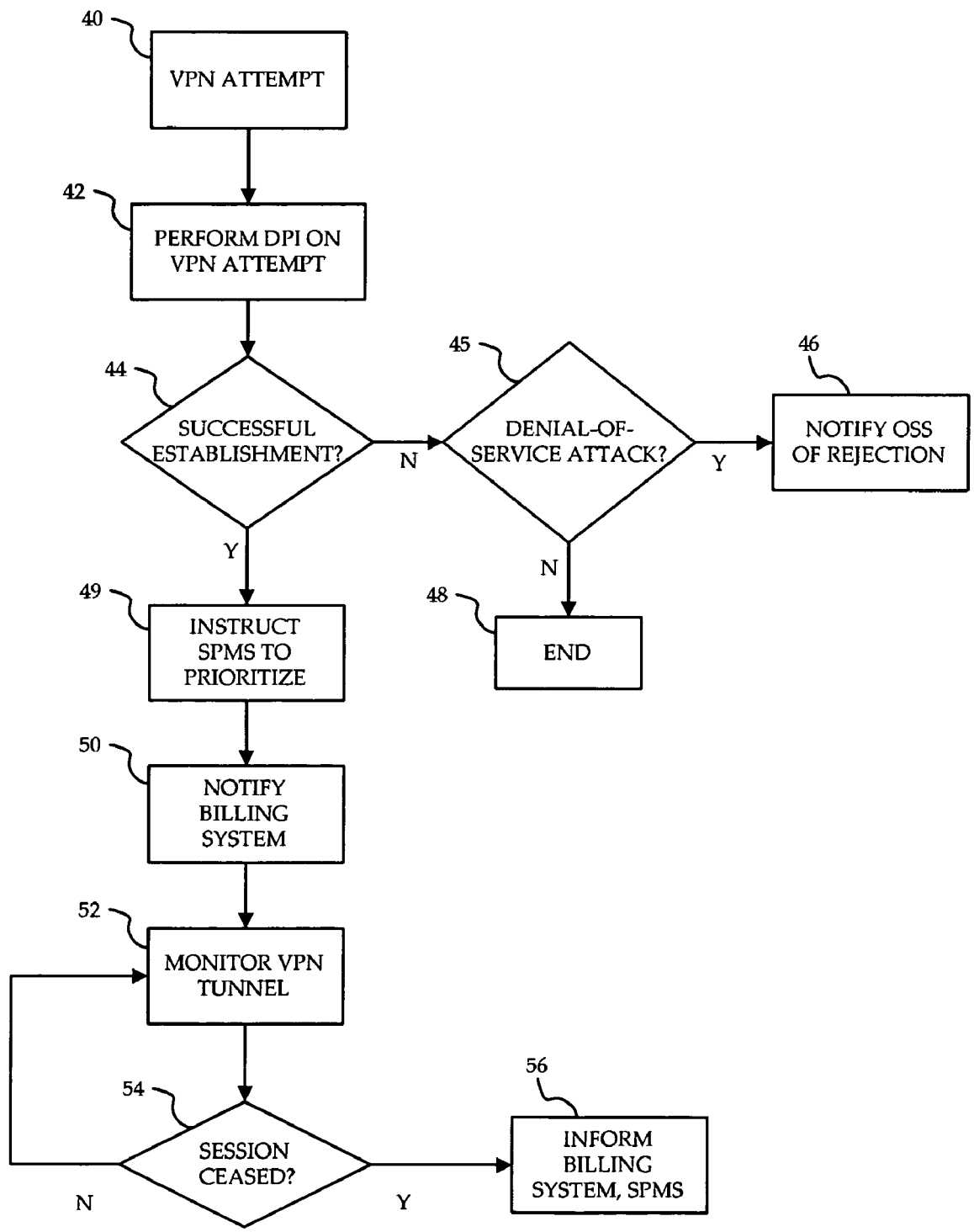
FIG. 2 is a flowchart of a method carried out by the deep packet inspector of FIG. 1 according to one embodiment of the invention.

Referring to FIG. 2, a flowchart of a method carried out by the deep packet inspector 30 according to one embodiment of the invention is shown. The deep packet inspector 30 monitors all the packets flowing between the VPNGW 18 and the end user device 10, or more generally between any VPNGW within the receiving sub-network 16 and any end user devices attempting to communicate with a VPNGW in the receiving sub-network. The deep packet inspector 30 has the capability to do stateful analysis of VPN connection states, and looks for patterns that indicate that a new VPN session is being established. Indicators of a new session flow include the appearance of new source addresses in packets destined for the VPNGW.

At step 40 the deep packet inspector 30 detects a VPN establishment attempt to the VPNGW 18, carried by packets through the gateway 24 and destined for the receiving sub-network 16. At step 42 the deep packet inspector 30 performs deep packet inspection (DPI) on traffic for the VPN establishment attempt. This DPI does not monitor the content or payload of actual connection, rejection, or acceptance messages, but rather monitors the flow of traffic in both directions (passing through the egress port to the receiving sub-network and coming from the receiving sub-network through the egress port) in an attempt to discern between an accepted VPN establishment attempt and a rejected VPN establishment attempt. The DPI is able to discern packet information outside of a packet's payload, such as packet size, packet source address, packet destination address, timing and relative timing of packet sequences, as well as looking into packet headers for information on protocol types. At step 44 the deep packet inspector 30 infers whether the VPN establishment attempt was accepted. For example, if the VPN establishment protocol use is IPSec, Internet Key Exchange (IKE) would be used for negotiating keys as part of the VPN security mechanism. The IKE packet negotiating sequences are very strictly defined as falling within one of two modes, Main Mode and Aggressive Mode. The packet sequences for an authentication rejection by IKE are well known, repeatable, and easily discerned from a successful flow. Apart from other distinguishing features, a rejected VPN establishment attempt will elicit minimal response packets flowing from the VPNGW 18 to the end user device 10 through the gateway 24.

If the deep packet inspector 30 infers at step 44 that the VPN establishment attempt was not successful, then the deep packet inspector 30 takes no action with respect to initiating a process which prioritizes the data packets that are part of the session. It is possible that the deep packet inspector 30 makes an incorrect inference at step 44 by concluding that the VPN establishment attempt was unsuccessful when in fact it was successful. In such a case, if the deep packet inspector 30 has incorrectly inferred that the VPN establishment attempt was not accepted then the packet flows between the end user device 10 and the receiving sub-network 16 will still be maintained at the default "best effort" using normal prioritization levels. It should also be noted that if the end user device 10 is on a part of the access network that does not have connectivity to the gateway 24 or if the gateway 24 should for some reason be unavailable, the end user device 10 will still be able to reach the receiving sub-network 16 using an alternate gateway to find an alternate path to the receiving sub-network 16 through the public packet communication network 12. The prioritization mechanism of the invention is such as to allow failsafe establishment of a session, even if the gateway 24 is unavailable or unreachable. An emergency response worker, for example, would still be able to establish a regular connection to an emergency response control centre.

In one embodiment, if the deep packet inspector 30 infers at step 44 that the VPN establishment attempt was not successful, then the deep packet inspector 30 determines whether the unsuccessful attempt has the characteristics of a denial-of-service attack. For example the deep packet inspector 30 may record the occurrence of unsuccessful attempts, and if the number of unsuccessful VPN establishment attempts exceeds a configured count or the rate of unsuccessful VPN establishment attempts is inconsistent with a human user (as opposed to a machine interface), then the deep packet inspector 30 infers that the unsuccessful VPN establishment attempt has the characteristics of a denial-of-service attack. Consideration of total number of unsuccessful attempts, possibly successive unsuccessful attempts or of a rate of unsuccessful attempts minimizes the chances of inconveniencing a legitimate user who has inadvertently failed the VPN establishment attempt (such as by mis-typing a password for secure VPN).

If the deep packet inspector 30 determines at step 45 that the unsuccessful attempt has the characteristics of a denial-of-service attempt, the deep packet inspector 30 informs the OSS of the access network at step 46 to limit access of the user (as identified by correlation of the source address of the VPN establishment attempt to the access network ingress port) to the access network in order to reduce the impact of a denial of service attack. The OSS can limit access for example by imposing rate limiting on the ingress port of the user through ingress policing or traffic shaping, or by re-routing the connection attempt to a worm or virus detection system and to an end user notification system. If the deep packet inspector 30 determines that the unsuccessful attempt does not have the characteristics of a denial-of-service attempt, the deep packet inspector 30 simply ignores the attempt, other than recording its occurrence for use in future detection of denial-of-service attacks.

If the deep packet inspector 30 infers at step 44 that the VPN establishment attempt was successful, then at step 49 the deep packet inspector informs the SPMS 26 of the session source address and destination address, which indirectly identifies the end user device 10, and the destination VPNGW 18, and indicates that prioritization is to be effected. With this information the SPMS 26 determines the required priority level to assign to the session, largely based on the identity of the VPNGW 18. The priority level is preferably established ahead of time between the administrator of the access network 14 and the owner of the VPNGW 18, and is higher than a default priority level which would otherwise be applied to the packet flow of the session. For example, if the VPNGW 18 belongs to a crisis management system for homeland security, the packet flows associated with that session may be given the highest QoS and priority levels. As the user may attempt to access the receiving sub-network from any geographic point, the invention is preferably implemented in a number of access networks. The QoS level agreed upon between the owner of the VPNGW 18 and the administrator of an access network may differ between different access networks, given that QoS manageability may differ between access networks.

The SPMS 26 implements the priority level indicated by the deep packet inspector 30 for the session by instructing components within the access network of the priority level required for the session. The priority level may be defined using a QoS policy or QoS level. Once the QoS policy is determined by the SPMS, the SPMS sends re-configuration commands to appropriate network elements, either directly or through an intermediary network management system, to implement and enforce the closest possible fit of the access network 14 capability to meet the desired QoS level for the session. The components within the access network handle packet flows related to the session at the priority level indicated by the QoS level. Establishment of per-hop behaviours to set a particular QoS level may take advantage of many well-known QoS mechanisms such as adjustment of physical layer capacity of access connections, MAC layer bandwidth assignment in shared access environments, use of QoS bounded MPLS virtual paths within the access network, and packet marking for queuing distinction at routing or switching points within the access network. In addition, marking of prioritized traffic may be accomplished by the gateway 24 for egress packets deemed as 'priority' and destined for transit across the public packet network 12, which will be of additional benefit when such public networks are equipped to support differential priority based on traffic marking.

Availability of a connection may be considered an additional aspect of prioritization that can be specified by the SPMS to apply to packet traffic flows associated with a particular session. The SPMS may request that elements of the access network carrying the traffic flows for the prioritized session preferentially receive backup power for longer periods of time than other network elements which do not carry prioritized traffic, thereby maintaining prioritized traffic flows for much longer periods of time in the face of extended power outages.

Returning to FIG. 2, at step 50 the deep packet inspector 30 informs the billing system 28 that prioritization of the session has begun. In response, the billing system notes the start time of implementation of the prioritization of the session. With certain VPN authentication protocols, such as IPsec IKE Aggressive Mode, user name or user mail address information may be intercepted 'in the clear' by the deep packet inspector 30, thereby providing the billing system 28 with additional billing detail for the session. The deep packet inspector 30 may so inform the billing system 28 through the SPMS 26. With the SPMS 26 involved in passing billing information to the billing system 28, the SPMS 26 can also provide a correlation between the access point 20 and the end user identity typically associated with that port, given that the SPMS 26 typically holds such information or has the ability to query other OSS components for this information.

Once the session is established, the deep packet inspector 30 monitors the session for indications that the communication for the session has ceased. For example, if there is no traffic flow over the VPN tunnel other than regular "keep alive" traffic not initiated by the user, the deep packet inspector 30 may infer that that session has ceased to be active. If at step 54 the deep packet inspector 30 infers that the session has ceased, either through detection of a VPN disconnection sequence, or indirectly by detecting a lack of traffic over the VPN tunnel for a configured duration, the deep packet inspector 30 informs the billing system 28 at step 56, possibly through the PSM 26, that the prioritization of the session is being halted. In response, the billing system 28 notes the termination time of the prioritized session, and prepares billing information in whatever manner as agreed upon between the owner of the receiving sub-network and the administrator of the access network. For example, the billing system 28 may bill the owner of the receiving sub-network based on the duration of the prioritized session, or on a per-session basis.

The deep packet inspector 30 also informs the SPMS 26 of termination of the session at step 56. The SPMS 26 may have already been notified of the ceased session due to an express disconnection, but if termination of the session is effected by the deep packet inspector due to inactivity on the VPN tunnel the SPMS 26 is informed of such. When the SPMS 26 is informed of the termination, the SPMS 26 informs other components within the access network 14 to terminate any special QoS status that had been granted to the session.

The invention has been described using a billing system, but the invention will have utility even if the disclosed billing system is not employed. Similarly, the invention has been described as monitoring of a VPN tunnel for inactivity. While this allows neglected sessions to revert to normal priority status, this feature is not necessary for the operation of the invention.

The invention has been described in which all packet flows between end users and the VPNGW or VPNGWs are prioritized. In an alternative embodiment, the functionality of the deep packet inspector 30 can be started or stopped upon being signaled. Such an embodiment allows a central authority to declare a "state of emergency", which is then made known to carriers managing access networks in which the invention is implemented. The state of emergency can then be used to "turn on" the deep packet inspector 30 and begin prioritization of emergency traffic, and to turn off the deep packet inspector 30 when the state of emergency is over. Alternatively, prioritization of traffic flows through designated classes of VPNGW could be turned off or on in response to states of emergency, while traffic flows through other classes of VPNGW could always remain "turned on".

The invention has been described using deep packet inspection for inferring whether a VPN establishment attempt was successful, and for monitoring traffic flows for a session to infer whether activity has ceased. Alternatively, simpler methods of monitoring traffic for inference of accepted VPN establishment attempts could be used, based on statistical methods on aggregate flows, as long as such methods are non-invasive and independent of any shared secrets between the VPN gateway and the end user device. However, a trade-off will usually occur between simplicity and cost versus probability of incorrect inferences as to session acceptance.

The embodiments presented are exemplary only and persons skilled in the art would appreciate that variations to the embodiments described above may be made without departing from the spirit of the invention. The scope of the invention is solely defined by the appended claims.

I claim:

1. A method of prioritizing a traffic flow in a packet communication system destined for a receiving sub-network hosting a virtual private network (VPN) gateway, the method comprising:
    forwarding packets from an end user device to the receiving sub-network through a first gateway in an access network;
    at the first gateway in the access network, determining whether the packets from the end user device are requesting a new session with the VPN gateway;
    at the first gateway in the access network, non-invasively and, independently of any shared secrets between the VPN gateway and the end user device, using a deep packet inspector to infer from the packets requesting the new session whether the request was accepted by the VPN gateway by monitoring both the traffic flow passing through an egress port to the receiving sub-network and the traffic flow coming from the receiving sub-network through the egress port; and
    when it is inferred that the request was accepted by the VPN gateway,
    using a subscriber and policy management system (SPMS) to determine a new priority level to assign to the new session, wherein the new priority level is higher than a default priority level and is predetermined by the owner of the VPN gateway;
    using the SPMS to reconfigure network elements in the access network to permit the traffic flow to the VPN gateway at the new priority level;
    using the SPMS to mark the packets from the end user device in the egress port with the new priority level before sending the packets to the VPN gateway; and
    maintaining the traffic flow for a session between the VPN gateway and the end user device at the new priority level until the deep packet inspector determines that there is no traffic flow over the VPN gateway other than traffic flow not initiated by a user.

2. The method of claim 1, further comprising:
    determining whether the packets have a source address for which the session with the VPN gateway is not currently being maintained.

3. The method of claim 1, further comprising:
    monitoring the traffic flow for the session using deep packet inspection; and
    terminating the session when monitoring of the traffic flow for the session indicates a lack of traffic, other than keep-alive traffic, over the traffic flow for a configured duration.

4. The method of claim 1, further comprising:
    informing a billing system that the session is maintained at a priority level higher than a default priority level.

5. The method of claim 4, further comprising:
    informing the billing system of user identification information.

6. The method of claim 1, further comprising:
    when it is inferred that the request was rejected by the VPN gateway, determining whether the rejection of the request has characteristics of a denial-of-service attack; and
    when the rejection of the request has characteristics of the denial-of-service attack, rate limiting within the access network the traffic flow from the end user device.

7. The method of claim 6, further comprising:
    recording the rejections of the requests; and
    when the number of the rejections of the requests exceeds a configured count, determining that the rejection of the request has the characteristics of the denial-of-service attack.

8. The method of claim 6, further comprising:
    recording the rejections of the requests; and
    when the rate of the rejections of the requests is inconsistent with a human interface at the end user device, determining that the rejection of the request has the characteristics of the denial-of-service attack.

9. The method of claim 1, further comprising:
    preferentially allocating backup power to network elements carrying the traffic flow.

10. A system in an access network for prioritizing a traffic flow in a packet communication system destined for a receiving sub-network hosting a virtual private network (VPN) gateway, the system comprising:
    a subscriber and policy management system (SPMS) that reconfigures network elements within the access network and marks packets from an end user device in an egress port to maintain the traffic flow for a session at a new priority level higher than a default priority level, wherein the new priority level is predetermined by the owner of the VPN gateway;

a first gateway in the access network that forwards the traffic flow to the VPN gateway;

an edge router that forwards the traffic flow to the first gateway in the access network;

means at the VPN gateway in the access network that determine whether the packets from the end user device are requesting a new session with the VPN gateway;

a deep packet inspector in the access network that non-invasively and, independently of any shared secrets between the VPN gateway and the end user device, infers from the packets requesting the new session whether the request was accepted by the VPN gateway by monitoring both the traffic flow passing through an egress port to the receiving sub-network and the traffic flow coming from the receiving sub-network through the egress port; and means at the VPN gateway to inform the SPMS that the session is to be given the new priority level after it is inferred that the packets requesting the new session were accepted by the VPN gateway until the deep packet inspector determines that there is no traffic flow over the VPN gateway other than traffic flow not initiated by a user.

11. The system of claim 10, wherein the first gateway in the access network furthering comprises:

a port within the edge router.

12. The system of claim 10, wherein the SPMS further comprises:

a database that associates a parameter associated with an end user port with either a specific data flow or a virtual path.

13. The system of claim 10, further comprising:

a plurality of VPN gateways, each of the VPN gateways having at least one respective address.

14. The system of claim 10, wherein the deep packet inspector is within the edge router.

15. The system of claim 10, wherein the edge router forwards VPN establishment requests through the first gateway.

16. The system of claim 10, wherein the deep packet inspector determines that the new session is established after identifying new source addresses in packets destined for the VPN gateway.

17. The system of claim 10, wherein the deep packet inspector determines that the new session is not established after identifying packet sequences for an authentication rejection.

18. The system of claim 10, further comprising:

an alternate gateway that is used when the first gateway is either unavailable or unreachable.

19. The system of claim 10, wherein the deep packet inspector is turned on during a state of emergency.

* * * * *